(12) United States Patent
Niessner et al.

(10) Patent No.: US 10,833,485 B2
(45) Date of Patent: Nov. 10, 2020

(54) PRE-CHAMBER SPARK PLUG

(71) Applicant: Federal-Mogul Ignition GmbH, Neuhaus-Schierschnitz (DE)

(72) Inventors: Werner Niessner, Steinheim (DE); Peter Janas, Duisburg (DE); Alexander Ott, Ratingen (DE)

(73) Assignee: FEDERAL-MOGUL IGNITION GMBH, Neuhaus-Schierschni (DE)

( * ) Notice: Subject to any disclaimer, the term of this patent is extended or adjusted under 35 U.S.C. 154(b) by 0 days.

(21) Appl. No.: 16/704,008

(22) Filed: Dec. 5, 2019

(65) Prior Publication Data

US 2020/0185889 A1 Jun. 11, 2020

Related U.S. Application Data

(60) Provisional application No. 62/776,286, filed on Dec. 6, 2018.

(51) Int. Cl.
| | |
|---|---|
| *H01T 13/02* | (2006.01) |
| *H01T 13/20* | (2006.01) |
| *F02B 19/08* | (2006.01) |
| *H01T 13/36* | (2006.01) |
| *H01T 13/32* | (2006.01) |
| *H01T 13/54* | (2006.01) |
| *H01T 13/52* | (2006.01) |

(52) U.S. Cl.
CPC ............ *H01T 13/02* (2013.01); *H01T 13/20* (2013.01); *H01T 13/36* (2013.01); *H01T 13/52* (2013.01); *H01T 13/54* (2013.01); *F02B 19/08* (2013.01); *H01T 13/32* (2013.01)

(58) Field of Classification Search
CPC ......... H01T 13/54; H01T 13/14; H01T 13/08; H01T 13/06; H01T 13/20; H01T 13/52; H01T 21/04; F02B 19/08
See application file for complete search history.

(56) References Cited

U.S. PATENT DOCUMENTS

| | | | |
|---|---|---|---|
| 4,963,784 A | 10/1990 | Niessner | |
| 5,554,908 A * | 9/1996 | Kuhnert | .................. F02B 19/12 |
| | | | 123/260 |
| 5,829,407 A | 11/1998 | Watson et al. | |
| 7,659,655 B2 | 2/2010 | Tozzi et al. | |

(Continued)

FOREIGN PATENT DOCUMENTS

| | | |
|---|---|---|
| DE | 102011012528 B3 | 5/2012 |
| DE | 102012102731 A1 | 7/2013 |

(Continued)

*Primary Examiner* — Mariceli Santiago
(74) *Attorney, Agent, or Firm* — Reising Ethington, P.C.

(57) ABSTRACT

A pre-chamber spark plug having a shell, an insulator disposed at least partially within the shell, a center electrode disposed at least partially within the insulator, a ground electrode forming a spark gap with the center electrode, and a pre-chamber cap connected to the shell and forming a pre-chamber. The pre-chamber cap includes two or more openings that are configured so that at least one inflowing fuel-air mixture jet is directed to a pre-chamber wall gap so as to flush out or remove gas from a previous ignition cycle. The two or more openings are angled so that a first inflowing fuel-air mixture jet of a first opening does not intersect with a second inflowing fuel air-mixture jet of a second opening.

19 Claims, 3 Drawing Sheets

(56) References Cited

U.S. PATENT DOCUMENTS

| | | | |
|---|---|---|---|
| 7,922,551 B2 | 4/2011 | Tozzi | |
| 8,584,648 B2 | 11/2013 | Chiera et al. | |
| 9,172,217 B2 | 10/2015 | Hampson et al. | |
| 9,225,151 B2 | 12/2015 | Douglas et al. | |
| 9,476,347 B2 | 10/2016 | Chiera et al. | |
| 9,653,886 B2 | 5/2017 | Chiera et al. | |
| 10,138,799 B2 | 11/2018 | Tozzi et al. | |
| 10,174,667 B1 * | 1/2019 | Cress | F02B 19/08 |
| 2005/0211217 A1 * | 9/2005 | Boley | H01T 13/54 |
| | | | 123/266 |
| 2007/0069617 A1 * | 3/2007 | Tozzi | F02B 19/12 |
| | | | 313/140 |
| 2008/0272683 A1 | 11/2008 | Boehler et al. | |
| 2009/0309475 A1 | 12/2009 | Tozzi | |
| 2012/0125287 A1 | 5/2012 | Chiera et al. | |
| 2012/0242215 A1 | 9/2012 | Hwang et al. | |
| 2014/0060479 A1 | 3/2014 | Tozzi et al. | |
| 2014/0102404 A1 * | 4/2014 | Sotiropoulou | F02P 13/00 |
| | | | 123/260 |
| 2014/0261296 A1 * | 9/2014 | Sotiropoulou | F02B 19/1014 |
| | | | 123/260 |
| 2016/0053670 A1 | 2/2016 | Tozzi et al. | |
| 2016/0053671 A1 | 2/2016 | Sotiropoulou et al. | |
| 2016/0053673 A1 | 2/2016 | Sotiropoulou et al. | |
| 2016/0276810 A1 | 9/2016 | Chiera et al. | |
| 2019/0072025 A1 | 3/2019 | Rabhi | |

FOREIGN PATENT DOCUMENTS

| | | | | |
|---|---|---|---|---|
| DE | 102014004943 A1 | | 2/2015 | |
| DE | 102014015707 A1 | | 12/2015 | |
| DE | WO2017064355 A1 | | 4/2017 | |
| EP | 3261199 A1 | | 12/2017 | |
| GB | 2361264 A | * | 10/2001 | H01T 13/467 |
| GB | 2361264 A | | 10/2001 | |
| JP | 2009270540 A | * | 11/2009 | |
| JP | 6548629 B2 | | 7/2019 | |
| RU | 2300164 C2 | | 5/2007 | |
| WO | WO2014149947 A1 | | 9/2014 | |
| WO | WO2018106924 A1 | | 6/2018 | |
| WO | WO2019068484 A1 | | 4/2019 | |
| WO | WO2019110381 A1 | | 6/2019 | |

* cited by examiner

PRE-CHAMBER SPARK PLUG

CROSS-REFERENCE TO RELATED APPLICATION

This application claims the benefit of U.S. Provisional Application No. 62/776,286, filed Dec. 6, 2018, the entire contents of which are herein incorporated by reference.

FIELD

This invention generally relates to spark plugs, and more particularly, to pre-chamber spark plugs.

BACKGROUND

Pre-chamber spark plug function in gasoline-driven engines depends on the inlet of unburnt gas and the flushing out of residual gas after combustion. In particular, flushing the burnt gas out of the pre-chamber of a passive pre-chamber spark plug has an effect on the thermal suitability of the spark plug. Incomplete flushing out of residual gas can result in irregular combustions caused by pre-inflammations in the pre-chamber of the spark plug. Pre-inflammations in the pre-chamber of the spark plug not only increase the temperatures of the various spark plug components such as the ground electrode, the center electrode, the insulator base, or the pre-chamber cap, but can also lead to pre-inflammations in the main combustion chamber.

SUMMARY

According to one embodiment, there is provided a pre-chamber spark plug, comprising: a shell; an insulator disposed at least partially within the shell; a center electrode disposed at least partially within the insulator; a ground electrode forming a spark gap with the center electrode; and a pre-chamber cap connected to the shell and forming a pre-chamber, the pre-chamber cap including two or more openings. The two or more openings are configured so that at least one inflowing fuel-air mixture jet is directed to a pre-chamber wall gap so as to flush out or remove gas from a previous ignition cycle, and the two or more openings are angled so that a first inflowing fuel-air mixture jet of a first opening does not intersect with a second inflowing fuel air-mixture jet of a second opening.

According to various embodiments, the pre-chamber spark plug may further include any one of the following features or any technically-feasible combination of some or all of these features:

- the two or more openings are equally spaced along the pre-chamber cap such that each opening is offset from a center point of the pre-chamber cap by an offset distance;
- the pre-chamber cap includes four or more openings;
- a third inflowing fuel-air mixture jet of a third opening and a fourth inflowing fuel air-mixture jet of a fourth opening do not intersect with either of the first inflowing fuel-air mixture jet or the second inflowing fuel-air mixture jet;
- each opening is disposed at an angle with respect to the radial spark plug axis, wherein each angle of each opening with respect to a radial spark plug axis is the same such that the first, second, third, and fourth inflowing fuel-air mixture jets do not intersect with a central spark plug axis;
- the pre-chamber wall gap is disposed at least partially between the insulator and a pre-chamber wall, the pre-chamber wall being an inner wall of the shell or an inner wall of the pre-chamber cap;
- the pre-chamber wall gap has a width that extends beyond an axial bore of the shell;
- the pre-chamber wall is an exposed inner wall of the shell, wherein the shell includes a stepped wall portion disposed between the exposed inner wall of the shell and the pre-chamber cap, and wherein the two or more openings are configured so that each inflowing fuel-air mixture jet is directed to the stepped wall portion of the shell;
- the two or more openings are configured so that each inflowing fuel-air mixture jet is directed to the stepped wall portion and then travels along the exposed inner wall and to an upper portion of the pre-chamber wall gap;
- the two or more openings are each oriented at an angle with respect to a central axis of the spark plug and the stepped wall portion is oriented at an angle with respect to a central axis of the spark plug, wherein each angle of the two or more openings is the same as the angle of the stepped wall portion;
- the pre-chamber wall gap is at least 1.5 mm wide;
- the spark gap is a surface discharge spark gap having an axial spark gap portion;

and/or

- the center electrode includes a center electrode body and a center electrode tip that is annular and surrounds at least a part of the center electrode body, wherein the ground electrode is a conductive seal oriented at least partially between an inwardly protruding portion of the shell and the insulator, and wherein the spark gap is a surface discharge spark gap that is annular and is located between the center electrode tip and the ground electrode along a surface of the insulator.

According to one embodiment, there is provided a pre-chamber spark plug, comprising: a shell; an insulator disposed at least partially within the shell; a center electrode disposed at least partially within the insulator; a ground electrode forming a surface discharge spark gap with the center electrode, the surface discharge spark gap being located along an outer surface of the insulator; and a pre-chamber cap connected to the shell and forming a pre-chamber, the pre-chamber cap including two or more openings. The two or more openings are configured so that at least one inflowing fuel-air mixture jet is directed to a pre-chamber wall gap so as to flush out or remove gas from a previous ignition cycle.

According to various embodiments, the pre-chamber spark plug may further include any one of the following features or any technically-feasible combination of some or all of these features:

- the two or more openings are configured such that the inflowing fuel-air mixture jet of a first opening does not intersect with the inflowing fuel-air mixture jet of a second opening;
- the pre-chamber wall gap is disposed at least partially between the insulator and a pre-chamber wall which is an exposed inner wall of the shell, wherein the shell includes a stepped wall portion disposed between the exposed inner wall of the shell and the pre-chamber cap, and wherein the two or more openings are configured so that each inflowing fuel-air mixture jet is directed to the stepped wall portion of the shell; and/or the center electrode includes a center electrode body and a center electrode tip that is annular and surrounds at least a part of the center electrode body, wherein the ground electrode is a conductive seal oriented at least partially between an inwardly protruding portion of the shell and the insulator, and wherein the spark gap is a surface discharge spark gap that is annular and is located between the center electrode tip and the ground electrode along a surface of the insulator.

According to one embodiment, there is provided a pre-chamber spark plug, comprising: a shell; an insulator disposed at least partially within the shell; a center electrode disposed at least partially within the insulator; a ground electrode forming a surface discharge spark gap with the center electrode; and a pre-chamber cap connected to the shell and forming a pre-chamber, the pre-chamber cap including two or more openings. A pre-chamber wall gap is disposed at least partially between the insulator and a pre-chamber wall, the pre-chamber wall being an exposed inner wall of the shell or an exposed inner wall of the pre-chamber cap. The pre-chamber wall includes a stepped wall portion.

According to various embodiments, the pre-chamber spark plug may further include any one of the following features or any technically-feasible combination of some or all of these features:
- the two or more openings are angled so that an inflowing fuel-air mixture jet of a first opening does not intersect with an inflowing fuel-air mixture jet of a second opening; and/or
- the surface discharge spark gap having an axial spark gap portion and the ground electrode is a conductive seal oriented at least partially between an inwardly protruding portion of the shell and the insulator.

DRAWINGS

One or more embodiments will hereinafter be described in conjunction with the appended drawings, wherein like designations denote like elements, and wherein.

DESCRIPTION

Figure 1:
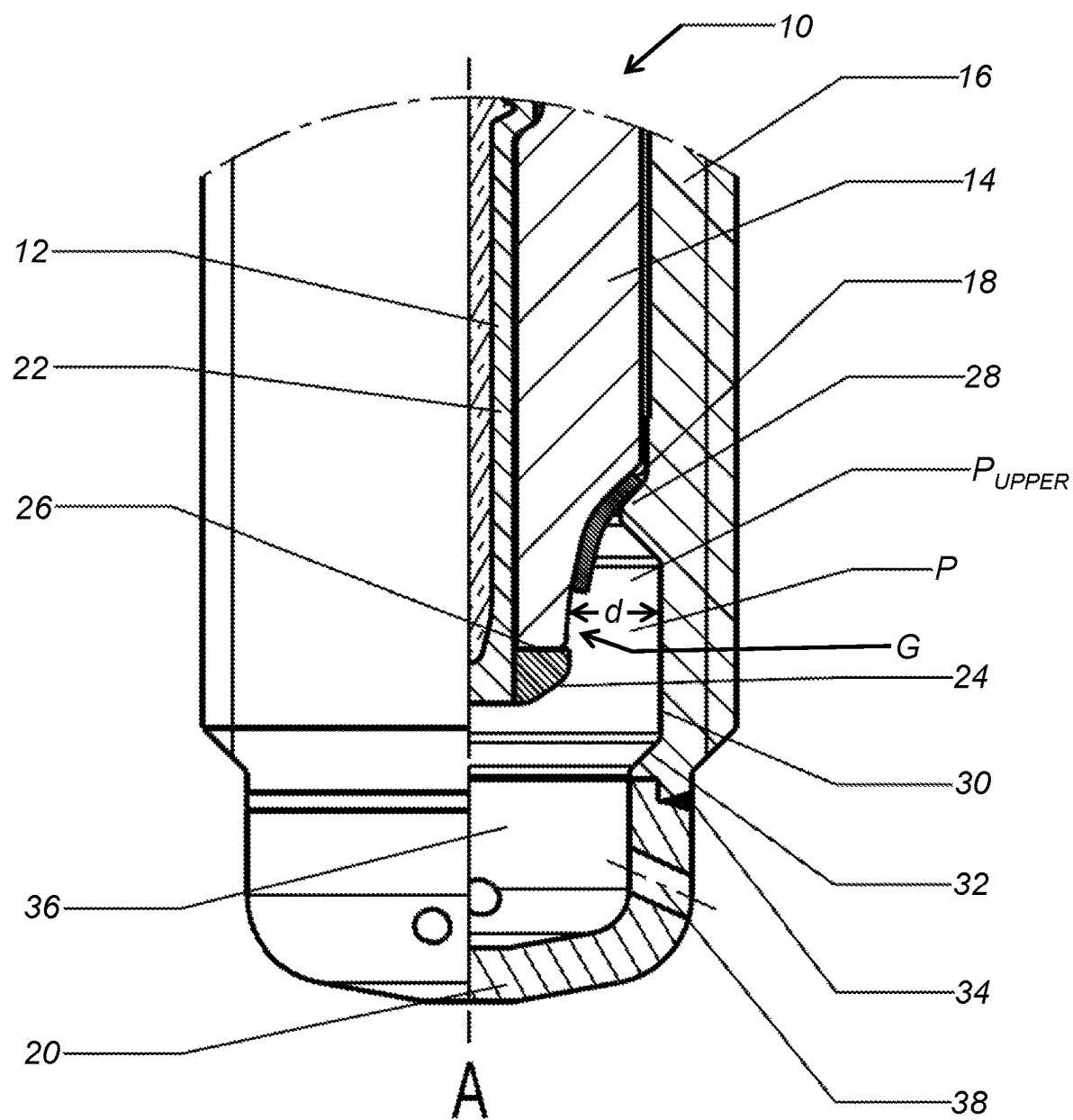
FIG. 1 is a partial, cross-sectional view of a spark plug according to one embodiment.

The pre-chamber spark plugs and operating methods described herein may be used to flush out or remove residual gas that is present in the pre-chamber due to a previous ignition cycle. Pre-chamber spark plugs that are built into a spark-ignited engine can experience irregular combustions caused by self-ignition of fuel-air mixture in the pre-chamber. For example, when the spark plug gets too hot, an uncontrolled ignition can occur in the main combustion chamber prior to the ignition point. This can increase the risk of engine damage.

During the compression stroke, the fuel-air mixture must be led into the pre-chamber of the spark plug in such a way that there is an ignitable mixture at the spark gap. Due to the subsequent combustion and the pressure increase resulting therefrom, torches escape through the pre-chamber openings and inflame the mixture in the main combustion chamber of the engine. However, in some instances, burnt fuel-air mixture in the spark plug pre-chamber may remain and cause self-ignition of inflowing fuel-air mixture of a subsequent ignition cycle. Thus, it is desirable to flush out this residual or remaining burnt fuel-air mixture from the pre-chamber. In at least some instances, this burnt fuel-air mixture remains in a gap that exists between the insulator (and/or center electrode) and the pre-chamber wall, which can be a wall of the metal shell of the spark plug or a wall of the pre-chamber cap. This gap can be termed the pre-chamber wall gap. Thus, according to at least one embodiment, the spark plug disclosed herein can include a pre-chamber cap with openings configured to direct an inflowing fuel-air mixture to this pre-chamber wall gap thereby flushing out or otherwise removing (or at least dispersing) the burnt fuel-air mixture.

Moreover, in at least one embodiment, narrow gaps between the insulator and the pre-chamber wall can be avoided. Thus, for example, the spark plug can include a pre-chamber wall gap that is large enough so as to increase the capability of gas to flow in this gap. By using a pre-chamber wall gap of at least 1.5 mm, for example, the gap permits the movement of gas within this area so that the inflowing fuel-air mixture can flush out or otherwise remove/disperse this burnt fuel-air mixture.

The pre-chamber spark plug arrangements described herein can be used efficiently in modern gasoline passenger car sized engines for the ignition of lean main combustion mixtures. This can reduce nitrous oxide emissions by lowering overall combustion temperatures. Moreover, the spark gap arrangement described herein can result in a faster combustion process and thus can help knock mitigation. In some embodiments, the pre-chamber spark plug is a thermally robust, passive pre-chamber spark plug for boosted direct injection gasoline engines, where the pre-chamber spark plug is used to precisely control the start of combustion, increase the engine efficiency, while decreasing pollutant emissions and providing a more stable combustion, compared to conventionally initiated combustion with a j-gap style spark plug. A passive pre-chamber realizes its gas exchange solely by the pressure difference between the pre-chamber and the main chamber and by the local field flow in the vicinity of the pre-chamber cap openings.

An example pre-chamber spark plug is shown in FIG. 1, where the pre-chamber spark plug 10 includes a center electrode 12, an insulator 14, a metal shell 16, a ground electrode 18, and a pre-chamber cap 20. The center electrode 12 includes a center electrode body 22 and a center electrode tip 24, which is shaped as a ring in the illustrated embodiment. The center electrode body 22 can be made of Inconel™ 600 or other suitable center electrode material, and the center electrode tip 24 can be made of a nickel alloy, or a precious metal (e.g., platinum, iridium) or alloy thereof. The center electrode body 22 is disposed within a central bore of the insulator 14, and projects from the insulator 14. The center electrode tip 24 is shaped as a ring or an annular component that circumscribes (at least part of) the projecting portion of the center electrode body 22. Also, the center electrode tip 24 abuts and/or is disposed on an end portion of the insulator 14.

The insulator 14 can be made of a ceramic material, including any suitable spark plug insulator material. The insulator 14 includes an axial bore in which the center electrode body 22 is disposed. The insulator 14 includes an axially-free end 26 (constituting an end portion of the insulator) at which the center electrode tip 24 is disposed. The insulator 14 also includes a curved outer surface that merges a large-diameter portion of the insulator to the axially-free end 26 of the insulator 14, which includes a smaller diameter than the large-diameter portion of the insulator. The ground electrode 18 is disposed between the insulator 14 and the metal shell 16, and contacts the metal shell at a metal shell inwardly-protruding portion 28 so as to be electrically grounded to the metal shell. The ground electrode 18 can be made of any suitable ground electrode material, including, in this embodiment, metal-based gasket-type materials that help create a gas-tight seal in the pre-chamber between the insulator 14 and the shell 16. The ground electrode 18 is annularly shaped and conforms to the curved outer surface of the insulator 14. The ground electrode 18 is secured in place by the metal shell inwardly-protruding portion and the curved outer surface of the insulator 14. The spark gap G is formed between a free end of the ground electrode 18 and the center electrode tip 24.

The metal shell 16 is made of any suitable spark plug shell material, and includes an axial bore in which the insulator 14 is disposed. The metal shell 16 includes the inwardly-protruding portion 28, an exposed inner wall 30, and a stepped wall portion 32. In some embodiments, the inwardly-protruding portion 28 is a portion of the metal shell 16 that helps form a surface discharge spark gap and also supports the insulator 14 via a seal (e.g., an alternate embodiment wherein the inwardly-protruding portion 28 forms the ground electrode instead of having a separate seal/ground electrode 18). In some embodiments, as illustrated, the inwardly-protruding portion 28 is a seal supporting projection which supports the ground electrode 18 which also serves as a conductive seal between the insulator 14 and the shell 16. The inwardly-protruding portion 28 can include two angled surfaces, with one of the angled surfaces abutting the ground electrode 18 such that the ground electrode 18 is held in place between the insulator 14 and the metal shell 16. The exposed inner wall 30 is a pre-chamber wall in that it partially defines the pre-chamber 36. This exposed inner wall 30 extends from the inwardly-protruding portion 28 to the stepped wall portion 32, and is parallel to the central axis A. The exposed inner wall 30 axially extends past the axially-free end 26 of the insulator 14 and the center electrode tip 24. The stepped wall portion 32 is disposed at or near an end of the metal shell 16, and slants inward from the inner wall 30 toward the central axis A. In another embodiment, the stepped wall portion 32 is formed at least partially or sometimes wholly within the pre-chamber cap 20. A pre-chamber wall gap P is present between the exposed inner shell wall 30 and the insulator 14. The pre-chamber wall gap P includes a width d as illustrated in FIG. 1, with the width d being measured at an axial location along the insulator outer surface that is halfway between the center electrode tip 26 and the closest end of the ground electrode 18. In one embodiment, this pre-chamber wall gap P is at least 1.5 mm. In another embodiment, this pre-chamber wall gap P is at least 2.0 mm and, in yet another embodiment, this pre-chamber wall gap P is at least 2.5 mm. In this embodiment, the exposed inner wall 30 is a radially expanded portion as compared with the remainder of the axial bore of the shell 16, which helps create a wider pre-chamber wall gap P.

The pre-chamber cap 20 is attached to the end of the metal shell 16 by a weldment 34 and is used to at least partially define a pre-chamber 36. The pre-chamber cap 20 and the end of the metal shell 16 can include mating protrusions (such as is illustrated in the embodiment shown in FIG. 1) to facilitate and/or strengthen the attachment of the pre-chamber cap 20 to the metal shell 16. The pre-chamber cap 20 includes one or more openings 38 and, in many embodiments, includes a plurality of openings 38. In one embodiment, the pre-chamber cap 20 includes two openings 38 that are disposed 180° apart. In another embodiment, the pre-chamber cap 20 includes four openings 38 that are disposed 90° apart. And, in other embodiments, the pre-chamber cap 20 includes six openings 38 that are disposed 60° apart, or eight openings that are disposed 45° apart. The openings 38 enable fluid communication between the pre-chamber 36 and a main combustion chamber. In particular, a fuel-air mixture can be introduced into the pre-chamber 36 from the main combustion chamber via the openings 38, which can then be combusted by an electric spark generated at the spark gap between the ground electrode 18 and the center electrode tip 24.

According to one non-limiting example, the spark gap G is a surface discharge spark gap that includes an axial spark gap portion (e.g., the portion extending along an outer surface of the insulator nose) between the center electrode tip 24 and the ground electrode or conductive seal 18. Thus, the spark travels along the outer surface of the insulator 14 up toward a terminal end of the spark plug 10. The combustion can propagate from the spark gap G through the openings 38 and into the main combustion chamber such that the fuel-air mixture in the combustion chamber is ignited. As a discharge over a surface requires lower voltage, a longer spark becomes possible. Further, providing a surface discharge spark gap that does not have a discrete ground electrode extending into the space or area of the pre-chamber, as compared with typical air gap style spark plugs, can help minimize flow obstacles, to better control inner aerodynamics. Additionally, the surface discharge spark gap can reduce the overall thermal behavior of the bulk flow and surface temperatures. Further, providing the spark location at the upper position inside the pre-chamber 36 (away from the openings 38), can be beneficial for flame propagation and subsequent pressure build-up in the pre-chamber, along with better mixing of the residual gases in the core nose region. Lastly, this sparking arrangement allows all the components to fit in a conventional M12 sized spark plug.

However, as mentioned above, burnt fuel-air mixture may remain in the pre-chamber 36 and, in particular, in the pre-chamber wall gap P. This remaining burnt fuel-air mixture can cause self-ignition of fuel-air mixture that enters the pre-chamber 36 during a subsequent engine cycle. To prevent this problem of self-ignition, the openings 38 of the pre-chamber cap 20 are configured so as to direct an inflowing fuel-air jet toward the pre-chamber wall gap P. Thus, the openings 38 of the pre-chamber cap 20 cause the inflowing fuel-air mixture to sweep away the remaining burnt fuel-air mixture residing in and around the pre-chamber wall gap P. In one embodiment, the openings 38 are configured so that each inflowing fuel-air mixture jet is directed to the stepped wall portion 32 and so that each inflowing fuel-air mixture jet travels along the exposed inner wall 30 and to an upper portion $P_{upper}$ of the pre-chamber wall gap.

Figure 2:
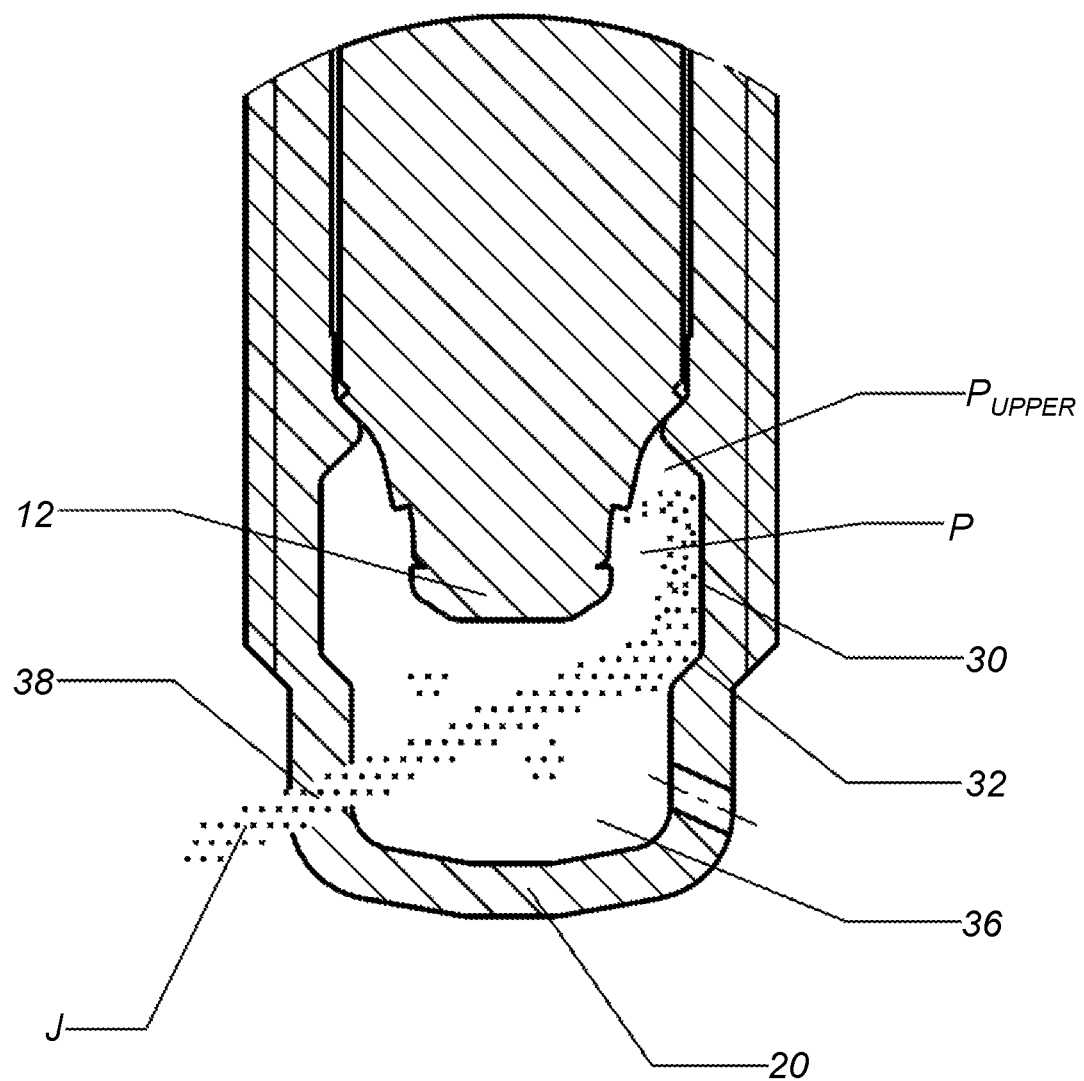
FIG. 2 is a schematic view of a spark plug showing flow patterns according to one embodiment.

In one embodiment, the openings 38 of the pre-chamber cap 20 can be angled such that the inflowing fuel-air jet is directed or aimed at the exposed inner wall 30 near the stepped wall portion 32. The stepped wall portion 32 is angled so that it leads into the exposed inner wall 30 of the pre-chamber wall gap P. Thus, the stepped wall portion 32 can help guide the inflowing fuel-air mixture jet J toward the pre-chamber wall gap P. FIG. 2 illustrates an inflowing fuel-air mixture jet J that enters the opening 38. As shown in FIG. 2, the angle of the openings 38 are configured to correspond to the angle of the stepped wall portion 32 so that the inflowing fuel-air jet J is guided to the upper portion $P_{upper}$ of the pre-chamber wall gap P near the ground electrode 18 and/or the inwardly-protruding portion 28 of the metal shell 16. This configuration causes the inflowing fuel-air jet J to diffuse, sweep away, or otherwise remove burnt fuel-air mixture from the pre-chamber wall gap P. The configuration of the openings 38 can be achieved by drilling through the pre-chamber cap 20 at a predetermined angle, which can correspond to the stepped wall portion 32, for example. The "predetermined angle" or "same angle" includes two angles that are within 10° of each other, to allow for manufacturing tolerances, for example. In one embodiment, the openings 38 are configured such that an outer circumferential portion $J_{outer}$ of the inflowing fuel-air mixture jet(s) J contacts and glides along an angled surface of the stepped wall portion 32. Configuring the openings to orient the jet J includes either direct flow to the gap P or indirect flow to the gap P (e.g., the jet J hits the internal step portion 32 before reaching the gap P).

Figure 3:
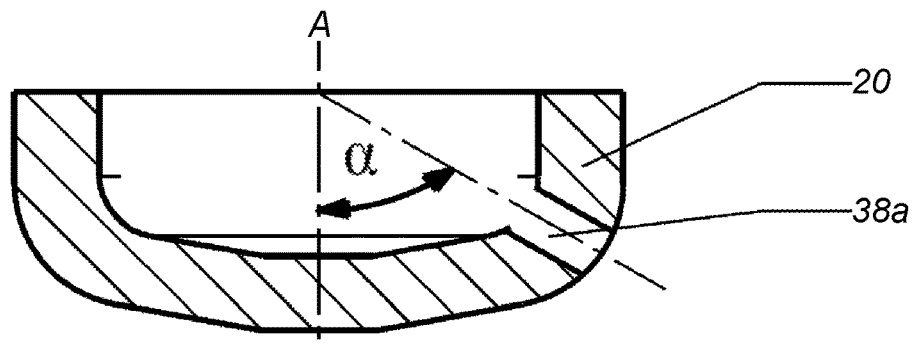
FIG. 3 is partial side view of a pre-chamber cap.
Figure 4:
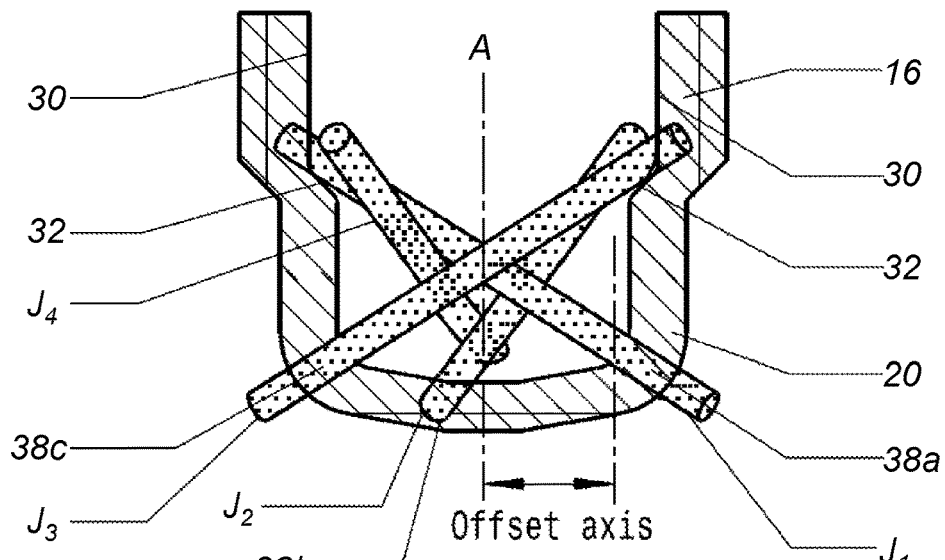
FIG. 4 is a side view of a pre-chamber cap, and illustrates inflowing fuel-air mixture jets corresponding to each opening of the pre-chamber cap.

With reference to FIGS. 3 and 4, there is shown the pre-chamber cap 20 along with a first opening 38a. The opening is cylindrical with the central cylindrical axis of the opening 38a being disposed at an angle α from the central axis A. The other openings 38 are also disposed at the same angle α, at least in one embodiment. Additionally, the stepped wall portion 32 may also be oriented at this same angle α with respect to the central axis A. Again, the "predetermined angle" or "same angle" includes two angles that are within 10° of each other, to allow for manufacturing tolerances, for example. With reference to FIG. 4, the pre-chamber cap 20 includes four openings 38 (three are shown and labeled as 38a,b,c). As shown, for each opening 38, an inflowing fuel-air mixture jet $J_1$-$J_4$ is directed to the stepped wall portion 32 and to the pre-chamber wall (or exposed inner wall 30) and, in at least one embodiment, the inflowing fuel-air mixture jets $J_1$-$J_4$ contact an angled surface of the stepped wall portion 32. Each of the openings 38 are offset from the central axis A by an offset distance, which can be selected based on the number of openings 38, the geometry of the pre-chamber, etc. In many embodiments, the openings 38 are offset from the central axis A by the same offset distance.

Figure 5:
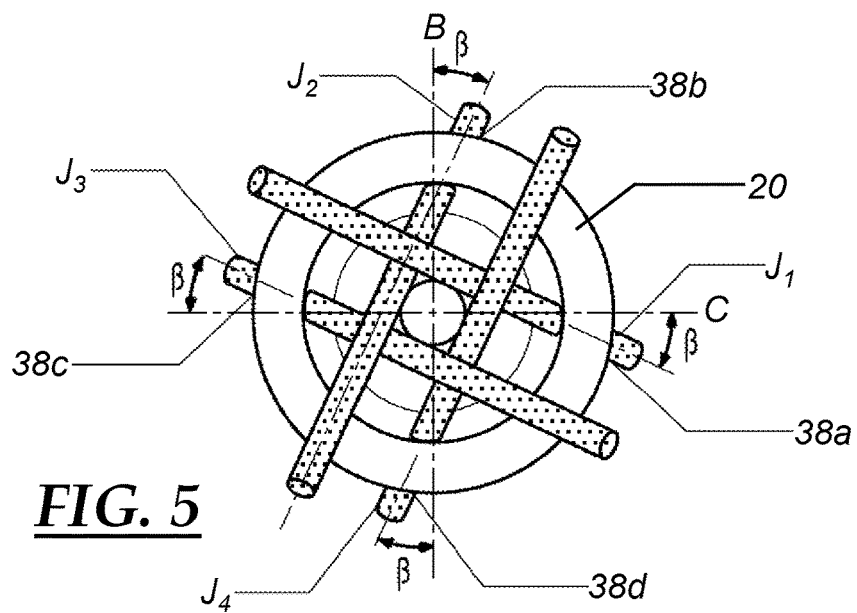
FIG. 5 is a top view of the pre-chamber cap of FIG. 4, and illustrates inflowing fuel-air mixture jets corresponding to each opening of the pre-chamber cap.

Also, as shown in FIG. 5, the openings 38 can be configured so that the inflowing fuel-air jets $J_1$-$J_4$ are each disposed at an angle β that is taken from a reference axis BC, which is centered with respect to the central axis A when viewed from the top as shown in FIG. 5. This reference axis BC can be referred to as the "radial spark plug axis," and each of B and C runs perpendicular to each other, and the central spark plug axis A is normal with respect to the radial spark plug axis. Further, as shown, each of B and C intersect at a center point of the pre-chamber cap 20. The openings 38 are thus configured so that the inflowing fuel-air jets $J_1$-$J_4$ generally do not intersect or overlap with one another. This prevents the inflowing fuel-air jets $J_1$-$J_4$ from interfering with one another. Thus, by configuring the openings 38 in this way, the fuel-air mixture can be directed to the pre-chamber wall gap P without impedance or interference caused by the flow of fuel-air mixture from another inflowing fuel-air jet.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pre-chamber spark plug, comprising:
   a shell;
   an insulator disposed at least partially within the shell;
   a center electrode disposed at least partially within the insulator;
   a ground electrode forming a spark gap with the center electrode; and
   a pre-chamber cap connected to the shell and forming a pre-chamber, the pre-chamber cap including two or more openings;
   wherein the two or more openings are configured so that at least one inflowing fuel-air mixture jet is directed to a stepped wall portion so as to flush out or remove gas residing in a pre-chamber wall gap from a previous ignition cycle, the pre-chamber wall gap is disposed at least partially between the insulator and a pre-chamber wall that is an exposed inner wall of the shell, the stepped wall portion is disposed at least partially between the exposed inner wall of the shell and the pre-chamber cap, and
   wherein the two or more openings are angled so that a first inflowing fuel-air mixture jet of a first opening does not intersect with a second inflowing fuel air-mixture jet of a second opening.

2. The pre-chamber spark plug of claim 1, wherein the two or more openings are equally spaced along the pre-chamber cap such that each opening is offset from a center point of the pre-chamber cap by an offset distance.

3. The pre-chamber spark plug of claim 2, wherein the pre-chamber cap includes four or more openings.

4. The pre-chamber spark plug of claim 3, wherein a third inflowing fuel-air mixture jet of a third opening and a fourth inflowing fuel air-mixture jet of a fourth opening do not intersect with either of the first inflowing fuel-air mixture jet or the second inflowing fuel-air mixture jet.

5. The pre-chamber spark plug of claim 4, wherein each opening is disposed at an angle with respect to a radial spark plug axis, wherein each angle of each opening with respect to the radial spark plug axis is the same such that the first, second, third, and fourth inflowing fuel-air mixture jets do not intersect with a central spark plug axis.

6. The pre-chamber spark plug of claim 1, wherein the pre-chamber wall gap has a width that extends beyond an axial bore of the shell.

7. The pre-chamber spark plug of claim 1, wherein the shell includes a stepped wall portion disposed between the exposed inner wall of the shell and the pre-chamber cap, and wherein the two or more openings are configured so that each inflowing fuel-air mixture jet is directed to the stepped wall portion of the shell.

8. The pre-chamber spark plug of claim 7, wherein the two or more openings are configured so that each inflowing fuel-air mixture jet is directed to the stepped wall portion and then travels along the exposed inner wall and to an upper portion of the pre-chamber wall gap.

9. The pre-chamber spark plug of claim 7, wherein the two or more openings are each oriented at an angle with respect to a central axis of the spark plug and the stepped wall portion is oriented at an angle with respect to a central axis of the spark plug, wherein each angle of the two or more openings is the same as the angle of the stepped wall portion.

10. The pre-chamber spark plug of claim 1, wherein the pre-chamber wall gap is at least 1.5 mm wide.

11. The pre-chamber spark plug of claim 1, wherein the spark gap is a surface discharge spark gap having an axial spark gap portion.

12. The pre-chamber spark plug of claim 11, wherein the ground electrode is a conductive seal oriented at least partially between an inwardly protruding portion of the shell and the insulator.

13. A pre-chamber spark plug, comprising:
a shell;
an insulator disposed at least partially within the shell;
a center electrode disposed at least partially within the insulator;
a ground electrode forming a surface discharge spark gap with the center electrode, wherein the surface discharge spark gap is located along an outer surface of the insulator; and
a pre-chamber cap connected to the shell and forming a pre-chamber, the pre-chamber cap including two or more openings;
wherein the two or more openings are each configured so that at least one inflowing fuel-air mixture jet is directed to a pre-chamber wall gap so as to flush out or remove gas from a previous ignition cycle, and
wherein the pre-chamber wall gap is disposed at least partially between the insulator and a pre-chamber wall that is an inner wall of the shell or an inner wall of the pre-chamber cap.

14. The pre-chamber spark plug of claim 13, wherein the two or more openings are configured such that the inflowing fuel-air mixture jet of a first opening does not intersect with the inflowing fuel-air mixture jet of a second opening.

15. The pre-chamber spark plug of claim 13, wherein the pre-chamber wall gap is disposed at least partially between the insulator and a pre-chamber wall which is an exposed inner wall of the shell, wherein the shell includes a stepped wall portion disposed between the exposed inner wall of the shell and the pre-chamber cap, and wherein the two or more openings are configured so that each inflowing fuel-air mixture jet is directed to the stepped wall portion of the shell.

16. The pre-chamber spark plug of claim 13, wherein the ground electrode is a conductive seal oriented at least partially between an inwardly protruding portion of the shell and the insulator.

17. A pre-chamber spark plug, comprising:
a shell having an inwardly protruding portion;
an insulator disposed at least partially within the shell and having a large-diameter portion, an axially-free end, and a curved outer surface that merges the large-diameter portion with the axially-free end;
a center electrode disposed at least partially within the insulator;
a ground electrode disposed at least partially between the inwardly protruding portion of the shell and the curved outer surface of the insulator and forming a surface discharge spark gap with the center electrode; and
a pre-chamber cap connected to the shell and forming a pre-chamber, the pre-chamber cap including two or more openings;
wherein a pre-chamber wall gap is disposed at least partially between the insulator and a pre-chamber wall, the pre-chamber wall being an exposed inner wall of the shell or an exposed inner wall of the pre-chamber cap, and
wherein the pre-chamber wall includes a stepped wall portion.

18. The pre-chamber spark plug of claim 17, wherein the two or more openings are angled with respect to a radial spark plug axis so that an inflowing fuel-air mixture jet of a first opening does not intersect with an inflowing fuel-air mixture jet of a second opening.

19. The pre-chamber spark plug of claim 17, wherein the surface discharge spark gap has an axial spark gap portion, and wherein the ground electrode is a conductive seal oriented at least partially between the inwardly protruding portion of the shell and the curved outer surface of the insulator.

* * * * *